T. W. Brown,
Tan-Vat,
No. 6,340. Patented Apr. 17, 1849.

UNITED STATES PATENT OFFICE.

TARLTON W. BROWN, OF HOWARDSVILLE, VIRGINIA.

TAN-VAT.

Specification of Letters Patent No. 6,340, dated April 17, 1849.

*To all whom it may concern:*

Be it known that I, TARLTON W. BROWN, of near Howardsville, in the county of Albemarle and State of Virginia, have invented a new and useful Improvement in Vats for Tanning Leather, which is described as follows, reference being had to the annexed drawings of the same, making part of this specification.

Figure 1:
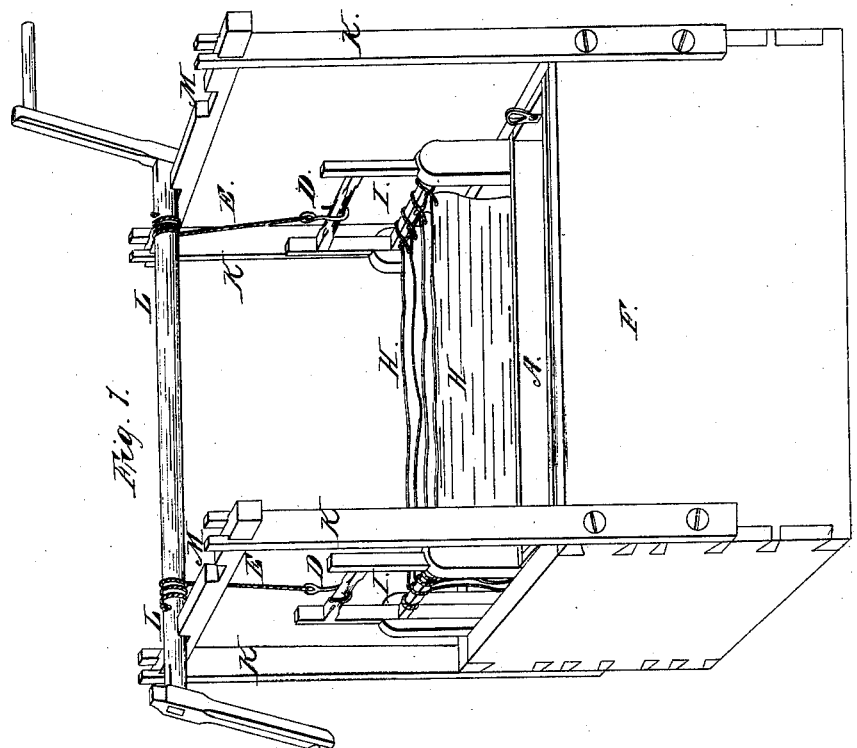
Figure 2:
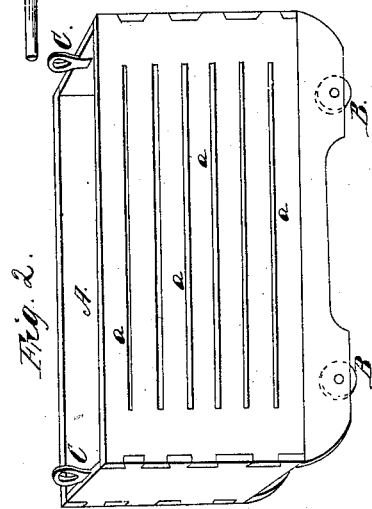

Figure 1, is a perspective view of the vat containing a movable bark chamber and hide frame, and windlass to operate the same. Fig. 2, is a perspective view of a locomotive bark chamber detached from the vat.

Similar letters in the figures refer to corresponding parts.

The nature of my invention and improvement consists in the employment of a rectangular chamber A for containing the bark, mounted upon four wheels B, by which it is moved to and from the vat, and provided with two loops C to receive the hooks D of the windlass chain E, for raising and lowering the said bark chamber A in the vat—one side and the bottom containing a number of parallel slits *a* to allow the liquor to run through and not the bark—the use of the said rising and falling and locomotive chamber A, in combination with the ordinary vat F, affording to the tanner a convenient mode of managing the bark, and enabling him to extract the greatest amount of tanning properties from it and to draw and handle the bark as well as the hides, which is a very important part of the tanning process—and to empty and supply the vat of bark with great facility—the wheels not only serving to facilitate the operation of transportation of the bark chamber, but to prevent its bottom from touching the bottom of the main vat F when lowered into it and then allowing a free passage for the liquor to circulate—and the slits in the side and bottom of the bark chamber permitting the liquor to run freely through the bark and out of the chamber as the latter is raised; and again to run into it and to circulate through the bark when the chamber is again lowered into the vat F, and by a repetition of these operations to extract the tanning properties from the bark most effectually—this mode of handling the bark in the process of tanning leather being entirely new—the bark heretofore having remained at the bottom of the vat in a compact mass preventing a change in its position and a free circulation of the water and consequently a proper extraction of the tanning properties from the bark and much difficulty in removing it whilst changing the bark. The strongest liquor would also remain at the bottom of the vat. My improved bark chamber will permit the strongest liquor to percolate through the bark and bottom of the chamber and pass thence into the part of the vat containing the hides and when the chamber is raised to a higher level the liquor will pass into the vat amongst the hides at a higher level.

The hides H are suspended to a rising and falling frame I placed in the same vat that receives the aforesaid chamber—being raised and lowered by the same windlass L that raises and lowers the bark chamber.

K is the frame that sustains the windlass.

L is the windlass.

M are the bearings in the frame to receive the windlass when the latter is applied to the raising and lowering of the bark chamber.

I do not claim a tan vat, nor a box with perforations in the side and bottom, nor a rising and falling hide frame, nor a windlass to operate the several movable parts of the vat, but What I do claim as my invention and desire to secure by Letters Patent, is—

The employment of the separate rising and falling bark chamber A for containing the bark, in combination with the main vat F containing the tan liquor—said movable bark chamber A being made, arranged and operated in the manner and for the purpose above stated.

In testimony whereof I have hereunto signed my name before two subscribing witnesses.

TARLTON W. BROWN.

Witnesses:
WILLIAM P. HALL,
JOHN C. RAYBURN.